E. J. DOUGLAS.
VEHICLE TRAILER.
APPLICATION FILED AUG. 8, 1921.
1,427,365.
Patented Aug. 29, 1922.
3 SHEETS—SHEET 1.
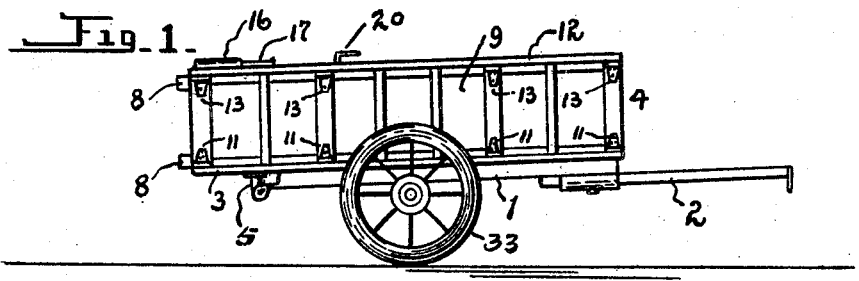
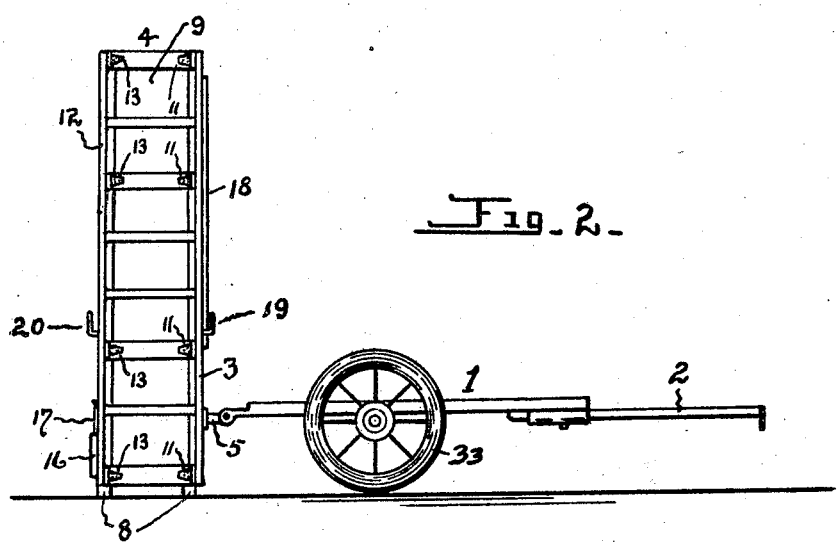
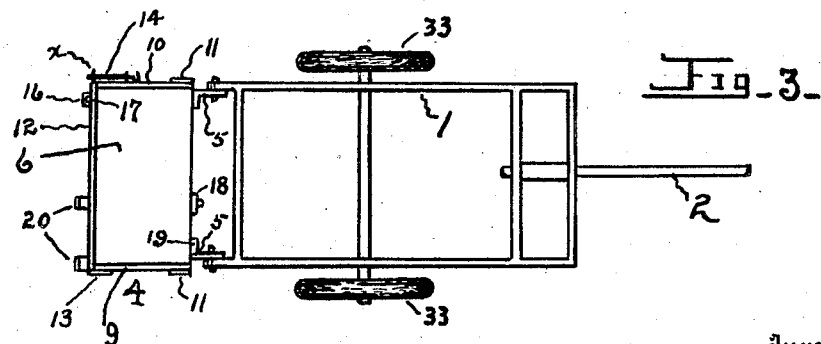
Inventor
Elizabeth J. Douglas
By Hiram A. Sturges,
Attorney

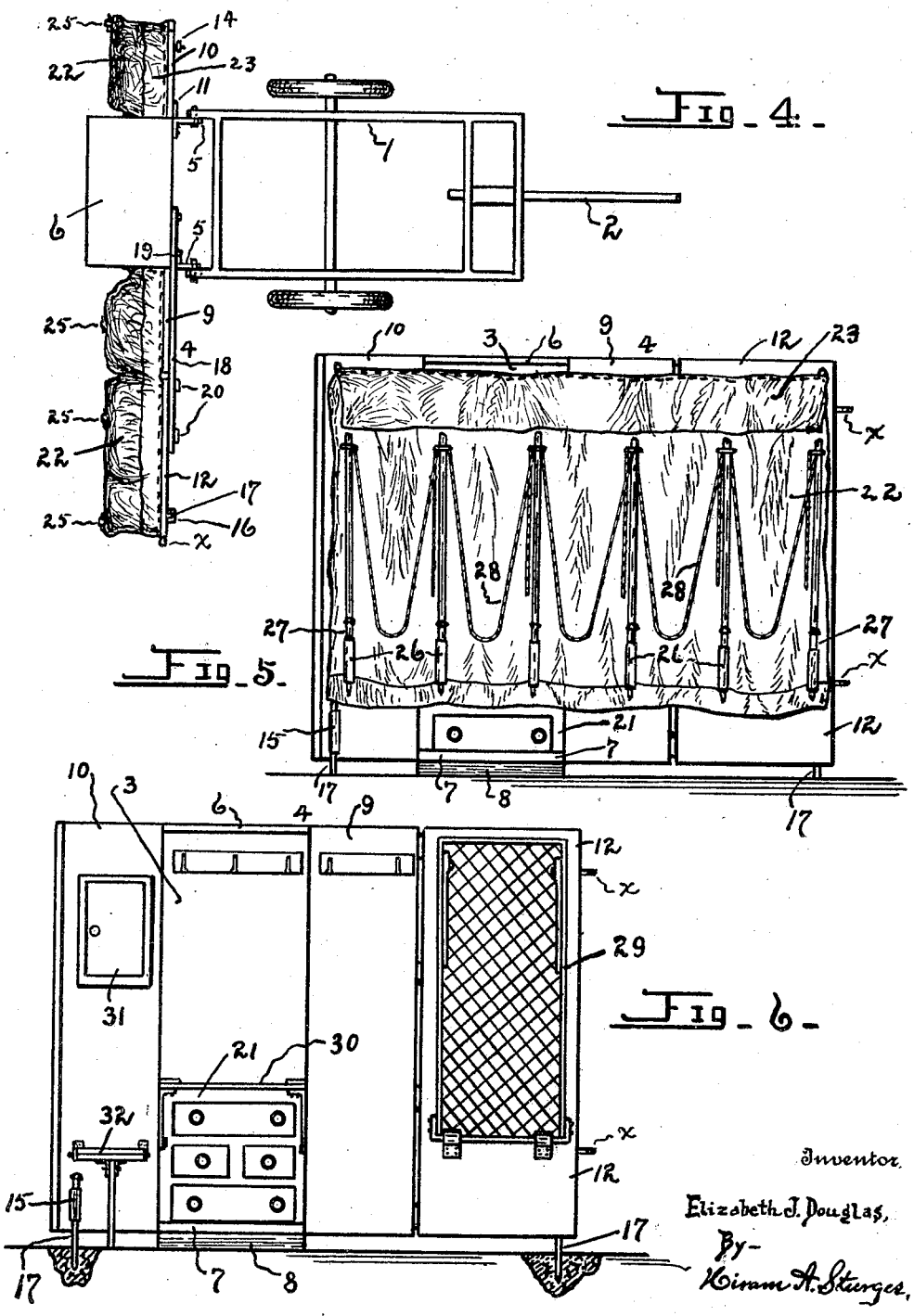

E. J. DOUGLAS.
VEHICLE TRAILER.
APPLICATION FILED AUG. 8, 1921.
1,427,365.
Patented Aug. 29, 1922.
3 SHEETS—SHEET 3.
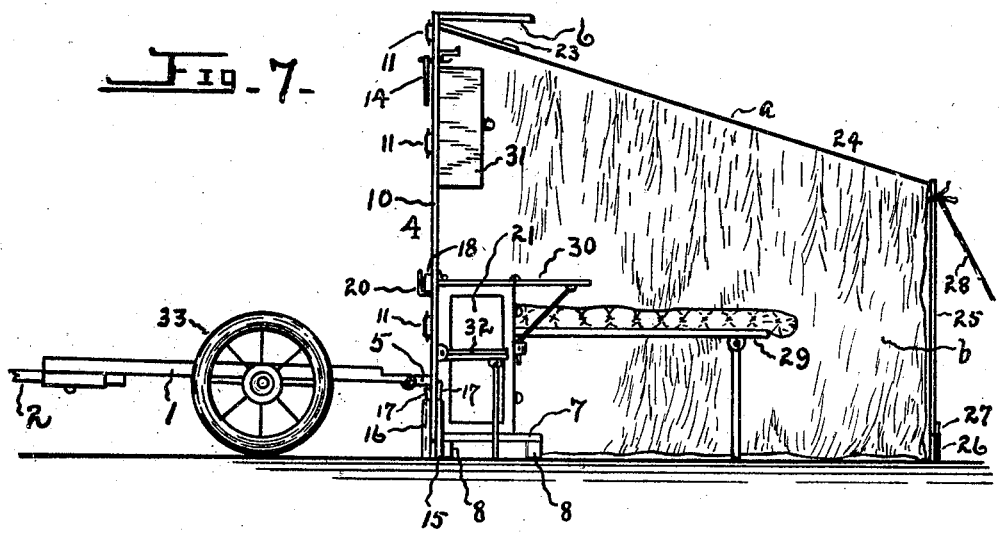
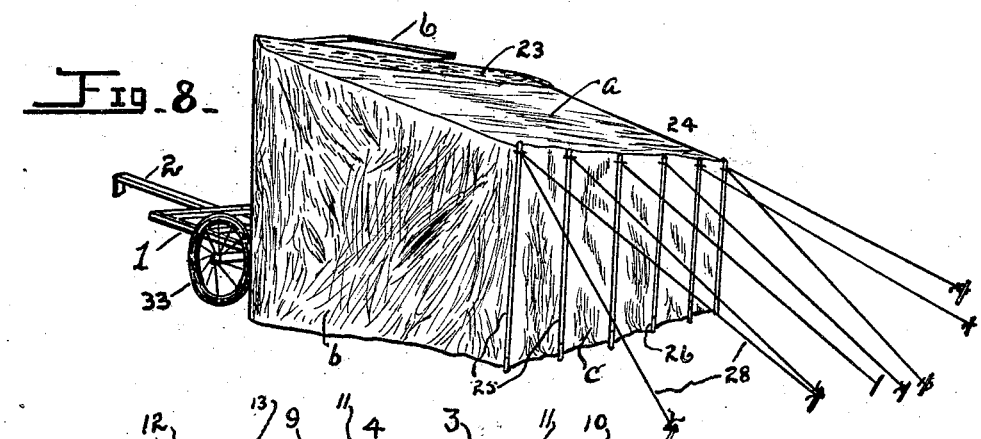
Inventor
Elizabeth J. Douglas

UNITED STATES PATENT OFFICE.

ELIZABETH J. DOUGLAS, OF CRETE, NEBRASKA.

VEHICLE TRAILER.

1,427,365.

Specification of Letters Patent.  Patented Aug. 29, 1922.

Application filed August 8, 1921. Serial No. 490,452.

*To all whom it may concern:*

Be it known that I, ELIZABETH J. DOUGLAS, a citizen of the United States, residing at Crete, in the county of Saline and State of Nebraska, have invented certain new and useful Improvements in Vehicle Trailers, of which the following is a specification.

This invention relates to a vehicle trailer adapted to be drawn by vehicles generally but particularly for use in connection with motor vehicles for tourists or those who travel long distances.

The invention has for one of its objects to provide a box so arranged that it may be swung from the chassis to approximately an upright position. Another object is to provide a box having hingeably connected bottom, top and sides so that these parts may be swung into alignment at the rear of the chassis. Still another object is to provide a tail gate which will be stationary with the bottom of the box to operate as a base for the support of the parts after they have been swung upwardly. The invention also includes fixture elements or certain kinds of furniture which are secured to the bottom and inner walls of the box for convenient use of tourists, these elements being so disposed that they will not prevent extension of the hingedly connected parts, and will permit folding of said parts to a box-form; and includes a flexible part or fabric adapted to be secured to the inner walls of said hingeably connected parts so that a tent may be conveniently formed.

With the foregoing objects in view and others to be mentioned hereinafter, the invention presents a novel and useful construction, combination and arrangement of parts as described herein and claimed, and as illustrated in the accompanying drawings, wherein,—

Fig. 1 is a side view of the trailer. Fig. 2 shows a side view of the trailer, the box being swung rearwardly to an upright position. Fig. 3 is a plan view of the parts shown in Fig. 2. Fig. 4 is a plan view showing the hingeably connected parts of the box extended and disposed in a vertical position. Fig. 5 is a rear view of the parts shown in Fig. 4. Fig. 6 is a view similar to that shown in Fig. 5, the fabric for the tent being removed to show certain fixtures carried by the bottom, sides and top of the box. Fig. 7 is a side view of parts when extended, one side of the tent being removed to show interior parts. Fig. 8 is a perspective view of the trailer showing the tent when extended. Fig. 9 illustrates means for maintaining the hingeably connected bottom, top and sides of the box in alignment; this view showing the sides of the parts opposite to the sides shown in Fig. 6.

Referring now to the drawing for a more particular description, the chassis 1 of the trailer is preferably provided with a removable tongue 2, wheels being indicated at 33. The bottom 3 of the box 4 is provided, between its ends, with brackets 5 for a pivotal connection with the rear end of the chassis.

The bottom 3 is provided with a front end plate 6, and the rear end of said bottom is provided with an end-plate 7 similar to the tail gate of a vehicle, but in the present instance this plate is secured stationary with the bottom and is disposed at right-angles thereto to operate as a base support when the box has been swung upwardly to the position shown in Fig. 2 of the drawing, shoes 8 being provided for the outer side of said plate.

The two side plates of the box are indicated, respectively, at 9 and 10, and are connected with the bottom to permit swinging movements therefrom, hinges 11 being shown for this purpose. Also the top of the box or cover 12 is connected with the side plate 9 to permit it to have swinging movements therefrom, hinges 13 being shown for this connection; and the cover 12 may be removably secured to the side plate 10 of the box by any suitable fastening means, hooks 14 on the side plate 10 cooperating with staples $x$ being shown for this purpose; and while hinges have been shown and specifically mentioned, it is obvious that any suitable pivotal connection for the bottom, sides and top may be employed to permit these parts to be extended while disposed upright in a single plane at the rear of the chassis, said plane being approximately at right-angles to the medial line of the chassis.

Numerals 15 and 16 indicate sleeves which are secured, respectively, to the side-plate 10 and cover 12, and in operation, after the box has been swung to an upright position, the shoes 8 then resting upon the ground, the side plates 9 and 10 may be swung outwardly to aligning positions with the bottom, the cover 12 also being swung into alignment with the bottom and side plates, and pins 17, which are slidably mounted in the sleeves 15 and 16 may then be driven into the ground, which aids materially in maintaining these parts in line. It will be noted that the shoes 8 which rest upon the ground during this operation, tend to prevent the side-plates and cover from engaging the ground during their swinging movements.

Numeral 18 indicates a brace or locking-bar which is pivotally mounted upon the bottom, and is adapted to be swung into engagement with a hook 19 which is provided for the bottom and into engagement with hooks 20 which are provided for the cover 12, said bar 18 thereby operating to maintain the side-plates, top and bottom in alignment.

By referring to Figs. 6 and 7 it will be seen that the mounting of the plate 7 is reinforced materially by the bureau or fixture element 21 which is secured to said end plate and to the bottom 3, and operates to maintain said plate at right-angles to the bottom, this being an important feature, since this end-plate is depended upon largely in supporting the hingeably connected parts in an upright position while the bottom is pivotally connected with the chassis.

Numeral 22 indicates canvas or other suitable fabric material, preferably provided with a reinforcing-strip or apron 23, said fabric and apron being secured, at one of their edges, to members 3, 9, 10 and 12 at the front or upper ends of the latter. The fabric 22 is of such form that it may be extended to provide the inclined top *a*, sides *b* and end *c* of a tent 24, best shown in Fig. 8, stakes 25 being secured at one of their ends to the fabric at spaced intervals thereof, their opposite ends being provided with sleeves 26, and pins 27 being slidably mounted in the sleeves 26 so that they may be readily driven into the ground, the stakes 25 being supported in an upright position, as usual, by strands 28, whereby a conveniently arranged shelter or compartment is provided, said members 3, 9, 10 and 12 being depended upon for the highest part of the compartment.

Numeral 29 indicates a fixture element for use as a bed, and at 30 is indicated a table these being respectively mounted to permit swinging movements from the inner side of the cover 12 and bottom 3, to be disposed horizontally or vertically, as shown in the drawings. Also the side-plate 10 is provided with a cabinet 31, and a stool 32 is provided which may have swinging movements, the arrangement of the tent and fixtures being such that they will be convenient in use when members 3, 9, 10 and 12 are extended, and that they will not prevent folding of the box.

Having explained the uses of the several parts, operation will be readily understood. It will be appreciated that the sides and cover, when folded to the positions shown in Figs. 1, 2 and 3 of the drawing, provide, together with the bottom, a receptacle for containing very many of the fixtures required for the comfort of tourists. The box may be readily swung to an upright position, and the arrangement of parts is such that it may be maintained in said position, and that the tent may be quickly and conveniently formed, said arrangement of parts also being such that only a limited period of time will be required for folding.

While I have described construction in detail and have illustrated specific details in the drawings, I do not wish to be understood as limiting myself in these respects, and changes in form, size, proportion and minor details may be made, as found to be of advantage, said changes being within the scope of the invention as claimed.

I claim as my invention,—

1. In combination, a chassis provided with wheels, a box including a bottom, an end plate provided with shoes and rigidly mounted upon the bottom, a pair of side-plates, and a cover, said box being mounted between its ends upon and normally supported by the chassis and adapted to have a swinging movement to an upright position to dispose the shoes of its end-plate upon the ground, the side-plates having such a connection with the bottom that they may be swung into line with the bottom, and said cover having such a connection with one of the side-plates that it may be swung into line with the pair of side-plates and said bottom.

2. In a vehicle trailer, a chassis provided with wheels, a box normally disposed upon the chassis and including a bottom pivotally connected between its ends with the chassis and provided with an end-plate, side plates connected with the bottom, a cover connected with one of the side-plates, said box being adapted to have a swinging movement to an upright position for disposing the end plate upon the ground, the connection of the side-plates with the bottom and the connection of the cover with the side-plate being such that they may be disposed in alignment after said box has been swung to said upright position, means for maintaining the bottom, side-plates and cover in alignment, a fabric element secured to the bottom, side-plates and cover and arranged to be extended, and a plurality of fixture elements secured to a side-plate, said bottom and said cover.

In testimony whereof, I have affixed my signature in presence of two witnesses.

ELIZABETH J. DOUGLAS.

Witnesses:
W. T. COLLETT,
W. R. DOUGLAS.